United States Patent [19]

Hall

[11] 3,886,926
[45] June 3, 1975

[54] WIRE SAW

[76] Inventor: George H. Hall, P.O. Box 244, Westford, Mass. 01886

[22] Filed: July 19, 1973

[21] Appl. No.: 380,831

[52] U.S. Cl. .................................................. 125/21
[51] Int. Cl. ............................................ B28d 1/08
[58] Field of Search ........ 125/12, 18, 21; 51/206 R, 51/206.5

[56] References Cited
UNITED STATES PATENTS

| 125,804 | 4/1872 | Gear | 125/12 |
|---|---|---|---|
| 1,687,089 | 10/1928 | Green | 125/18 |
| 2,442,153 | 5/1948 | Pyl | 125/21 |
| 2,633,681 | 4/1953 | Sam | 125/18 X |
| 2,982,060 | 5/1961 | Klingspol | 51/206.5 X |
| 2,986,136 | 5/1961 | Wayland | 125/21 |
| 3,343,308 | 9/1967 | Fessel | 185/21 X |
| 3,383,807 | 5/1968 | Miller | 51/206 R |

Primary Examiner—Harold D. Whitehead
Attorney, Agent, or Firm—Schiller & Pandiscio

[57] ABSTRACT

A cutting tool is disclosed comprising a plurality of blocks of composite, comminuted abrasive in a bonding matrix, connected to a metallic substrate by a braze comprising a layer of an elastically pliant metal having high thermal conductivity sandwiched between a metallic material which has a melting point below the melting point of both the matrix and the metallic substrate. The tool may be formed into a band saw and is especially useful for cutting large blocks of minerals such as granite.

7 Claims, 4 Drawing Figures

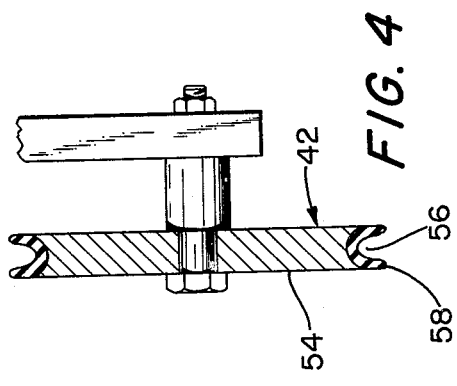
FIG. 4
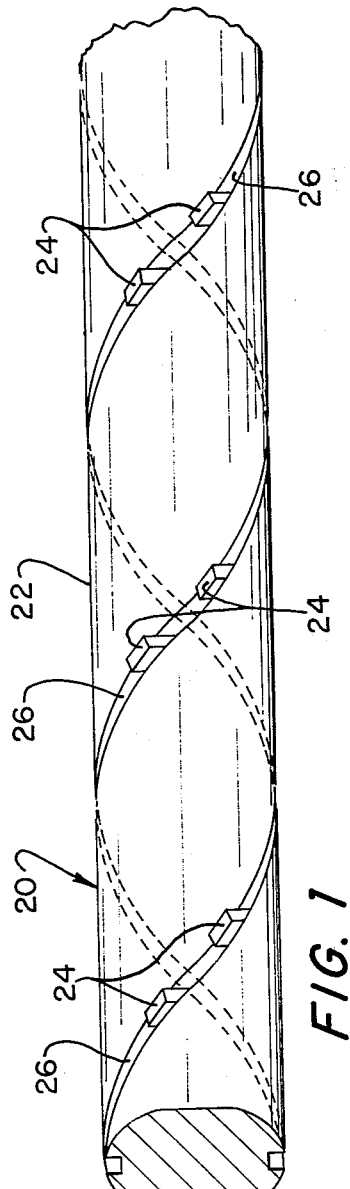
FIG. 1
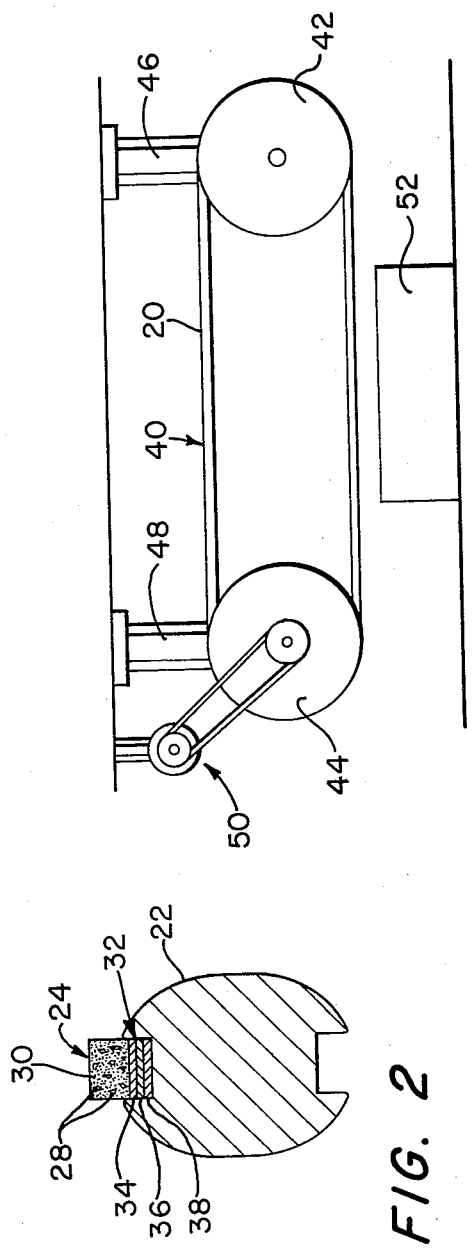
FIG. 3
FIG. 2

WIRE SAW

This invention relates to cutting tools and more particularly to cutting tools of the type which employ abrasive composites as cutting elements, and new methods of making such tools.

Composites formed of finely comminuted abrasive particles, such as diamond dust or grit, disposed in a metal or ceramic matrix are used extensively as the cutting elements in tools used for slicing large blocks of minerals such as marble, granite and the like. For cutting large blocks of such minerals, particularly to make architectural facings, the prior art has used very large cutting tools which have posed a number of problems. For example, one of the prior art systems employs a solid rotary blade with a number of diamond/metal matrix composite blocks bonded to the periphery of the blade as the abrasive cutting elements. Making wide cuts requires a large blade (e.g. with a radius of six feet or more). Such a rotary blade tends to flex laterally with respect to its plane of rotation. Hence, such blades tend to be very thick to impart the structural rigidity necessary to provide clean cuts. This thick blade cuts an equally thick swath and is therefore slow, produces an excessive amount of swarf while destroying valuable mineral, is wasteful of abrasive material and is obviously quite expensive to operate.

Alternatively, oscillating blades have also been used in which the diamond composites have been fixed to the cutting surface of the saw. The operation of an oscillating blade is considerably slower than that of the rotary blade and fairly complex equipment is required to oscillate the sawblade to achieve a cut of any substantial architectural size. Further, the same lateral flexing problem requires that the blade must also be reinforced and hence tend to be thick and wasteful of both abrasive and mineral in operation.

In either case, when using a substantially rigid blade the abrasive composite elements providing the cutting units for the system are subject primarily to shear forces due to the cutting motion of the saw. Hence, the structure which is used to fix the abrasive composites to the blade need only be designed to withstand the shear forces acting substantially parallel to the direction of the cutting motion of the blade.

While it has been suggested that wire or band saws can be used to cut minerals to large dimensions, abrasive composites bonded to the surface of such a wire saw will be subject not only to the shear forces due to the cutting motions of the saw but, inasmuch as wire or band saws are in the form of endless belts which are necessarily bend around sheaves, the saw must flex laterally for proper operation. Abrasive elements bonded to the saw must necessarily withstand the tensile forces arising out of blade flexure which would tend to tear or at least weaken the bonding to the abrasive elements to the blade so that the abrasive elements will ultimately be sheared off.

Composite abrasive elements formed by admixing diamond grit for example in a metal matrix, have been bonded by the prior art to a metallic substrate mostly by either electrolytic bonding processes or sinter bonding processes.

Prior art electrolytic bonding techniques typically may require relatively long and commercially unacceptable deposition times, especially where relatively dense deposits are desired. Additionally, oxide films often present on the metallic substrate may adversely affect adhesion. Accordingly, the art has typically carried out electrolytic depositions in inert or reducing atmospheres, and in some instances also may apply a flux to the metallic surface prior to deposition. Such procedures obviously increase production costs.

Sinter bonding techniques are generally faster than known electrolytic bonding techniques, but require elevated temperatures which presents other problems. For example, sinter bonding may typically require temperatures approaching 80 percent or more of the melting temperature (in degrees Kelvin) of the bonding matrix; typically a metallic or ceramic material which may melt or degrade at 1200°–1500°K or higher. At such temperatures metallurgical properties of the metallic substrate may be adversely affected. Also, diamonds exposed to such temperatures may suffer some deterioration from graphitization. For example, graphitization of diamonds will occur relatively rapidly at a temperature of about 1000°K; even below 1000°K graphitization may still occur, although at a somewhat slower rate. These latter problems may be overcome by carrying out the sintering process in a non-oxidizing atmosphere, but at an increased operating cost.

Composite abrasive connected to a wire or band saw by either sinter bonding or electrolytic bonding have not been satisfactory because the bonds usually fail to show a long term stability. It is thus a primary object of the present invention to provide a novel wire saw. Yet another important object of the present invention is to provide a novel wire saw structure which permits rapid and economical cutting of large blocks of architectural mineral material at high speeds with a narrow cut.

Other objects of the invention will in part be obvious and will in part appear hereinafter. The invention accordingly comprises the processes involving the several steps and the relation of one or more of such steps with respect to each of the others, and the products possessing the features, properties and relation of elements which are all exemplified in the following detailed disclosure and the scope of the application of which will be indicated in the claims.

Generally, to effect the foregoing and other objects, the present invention contemplates forming an abrasive tool by brazing one or more composite cutting elements to a metallic substrate. The braze comprises at least three layers including a pliantly elastic metallic layer sandwiched between a pair of bonding layers of a metal which melts below the melting point of either the substrate or matrix metal and bonds well to both the latter. To apply the braze, one positions the three layer sandwich between an abrasive composite block and the substrate, hold the block, sandwich and substrate together under pressure, and heat the sandwich to brazing temperature by passing an electric current through the substrate.

The substrate is preferably a steel wire exhibiting negligible elongation under extreme tension short of its elastic limit, the wire preferably having two spiral grooves opposite one another. The cutting elements are brazed into the grooves as a series of spaced teeth. The wire is arranged in an endless belt and held in tension between at least two sheaves having grooves lined with a comparatively soft, elastic material which the abrasive elements can engage without substantially tearing, cutting or gouging.

For a fuller understanding of the nature and objects of the present invention, reference should be made to the following detailed description taken in connection with the accompanying drawings wherein:

FIG. 1 is a fragmentary perspective view of a portion of an abrasive cutting wire of the instant invention;

FIG. 2 is an enlarged cross-sectional view of the tool of FIG. 1 taken along line 2—2;

FIG. 3 is a side elevational schematic of a wire saw of the present invention; and FIG. 4 is an enlarged cross-section taken through one of the sheaves of FIG. 3.

Referring now to FIGS. 1 and 2 there is shown a preferred embodiment of cutting wire 20 of the instant invention in the form of an elongated body or substrate member 22 made of a metal such as steel wire or the like. Body 22 is shown as having a generally elliptical cross-section although it will be understood that body 22 may have a cross-section of a variety of shapes and may be, for example, circular, triangular or square. Body 22 supports a plurality of abrasive segments or blocks 24 as will be described in detail hereinafter.

Body 22 has one or more relatively thin, narrow notches or slots 26 formed on its surface, diagonal to its length. Preferably slots 26 are in the form of elongated grooves, e.g. as shown in FIG. 1, forming a helix around the long axis of body 22. It will be understood, however, that slots 26 may also comprise a plurality of short notches (not shown) which are preferably arranged substantially on a helical line along body 22.

A plurality of relatively short abrasive segment blocks 24 are mounted in spaced-apart relation in slots 26. Blocks 24 typically comprise a mixture of diamond particles, e.g. diamond bits and grit 28 in a bonding matrix 30, all as well known in the art. The size of the diamond particles 28 and the proportion of particles to bonding matrix are not critical to the invention, and may be varied over a wide range as is well known in the art. Thus for example, blocks 28 may comprise diamond particles varying in size in the range of from 1 to 1200 microns, and may be present in an amount in the range of 5 to 74 volume percent, based on the amount of bonding matrix.

It will be appreciated, as above noted, that the wire is intended to flex. Hence, to avoid cracking matrix 30 by the forces arising during flexure of wire 20, the matrix preferably is somewhat flexible. To this end, matrix 30 may comprise principally copper, e.g. up to about 70 percent copper, or some other malleable metal, and include lesser amounts of other metals such as iron, zinc, tin, titanium, chromium, zirconium and the like. The use of copper as the principal matrix material imparts the desired degree of flexibility to blocks 24. Blocks 24 are formed as an unitary mass, e.g. by sintering the bonding matrix by techniques well known in the art.

Blocks 24 are sized relative to the depth of slots 26 so as to protrude beyond the surface of body 22 for a short distance, e.g. one-eighth inch when positioned in the slots. The diamond particles in the blocks form the abrasive or cutting elements of the blade as will become clear from the description following.

Abrasive element blocks 24 are held in slots 26 by a novel bonding system comprising a layered metallic braze indicated generally at 32. As noted, braze 32 is a sandwich of an elastically pliant metal between layers of a low melting point metal having a tensile strength of at least the order of the pliant metal and which bonds strongly to the pliant metal, to the substrate metal of wire 20 and to the matrix material of block 24. Braze 32 typically then comprises a plurality of relatively thin metal-containing layers including an inner layer comprising metallic copper in major proportion, sandwiched between layers each comprising metallic silver in major proportion. By way of example, three metallic layers (34, 36, and 38) are shown, although it will be understood that braze 32 may comprise four or more layers. Typically the metallic layers (34, 36 and 38) are as thin as about 0.005 inch and may be the same or different thickness; however, for the sake of clarity the relative thicknesses of the metallic layers (34, 36 and 38) in FIG. 2 have been exagerated. Layers 34 and 38, the outside layers, each comprise a thin metallic film, comprising silver in major proportion, and may include in lesser amounts alloying metals with silver such as copper, zinc, cadmium and nickel.

The middle layer 36 comprises a thin film comprising metallic copper in major proportion. Thus, for example, layer 36 may comprise substantially pure copper, or one or more alloying metals may be included with the copper. Layer 36 may be substantially the same thickness as layers 34 and 38; preferably, however, layer 36 is somewhat thicker than either of layers 34 and 38 for reasons as will become clear from the description following.

The layers of braze 32 typically are laid in slots 36, either one layer at a time or as a sandwich. Then abrasive blocks 24 are positioned in slots 26 on top of one outside layer. The blocks are then clamped, under pressure, to braze 32 and the blocks and body 22 are then brazed together by heating the sandwich until the silver-containing layers melt and flow.

In a preferred embodiment of the present invention, brazing is affected by induction heating of the metal substrate body 22, by passing an electric current through the body. This procedure has a number of important advantages. For one, heating may be effected relatively rapidly (as compared with infra-red heating procedures) with the result that the diamond particles may be subjected to high temperature for only a relatively short period of time, whereby high-temperature deterioration of the diamonds may be kept to a minimum. Thus typically, heating to brazing may be completely in about ten seconds or less. Another advantage is the elimination of substantial equipment often required by the prior art, e.g. for carrying out heating in inert or reducing atmospheres.

One illustrative embodiment of the invention will now be described. Referring now to FIGS. 1 and 2, a band type wire saw is formed using principles of the present invention.

Maraging steel wire available from Hamilton Precision Metals, Lancastor, Pa., U.S.A. as type No. 300 is used as the substrate member 22. The manufacturer describes this wire as cold worked and maraged steel comprising substantially 10–19 percent nickel, 8.5–9.5 percent cobalt, 4.6–5.2 molybdenum, 0.5–0.8 percent titanium, less than about 0.1 percent of each of copper, manganese, aluminum, silicon, boron, zirconium and calcium, all parts by weight, the balance iron. This material, having a diameter of about 0.175 inches has a tensile strength of about 6000 psi.

Two helical slots 26 are preferably cold rolled into the surface of the wire substrate to avoid providing any cuts or nicks on the inside surface of slots 26. Slots 26 are each about 0.1 inches wide and about 0.018 inches deep throughout their length. Slots 26 complete a twist around substrate member 22 every twenty-four inches; the helices are 180° out-of-phase with each other.

Elongated brazing strips comprisingly three-layer composite metal sandwiches are placed into slots 26. The composite metal sandwiches comprise a substantially pure metallic copper core 36 (about 0.005 inches thick) bonded on each side with layers 34, 38 (each about 0.0025 inches thick) comprising about 50 percent by weight metallic silver, 16 percent cadmium, 15.5 percent of each of copper and zinc, and 3 percent nickel.

A plurality of abrasive element blocks 24 are formed as follows:

Blocks 24 comprise a unitary mass of diamond particles in a bonding matrix. The diamond particles comprise a mixture of different size diamond particles, as follows: 40 volume percent of 40–50 mesh, 40 volume percent of 50–60 mesh, and 20 volume percent of 60–80 mesh (all mesh sizes Tyler Standard Screen Scale sieves series). The diamond particles are mixed with a bonding matrix comprising about 69 percent copper, 11 percent zinc, 8 percent iron, 2 percent tin, 3 percent titanium, 2 chromium, 1 percent zirconium, the balance 4 percent of Easy-Flo 3, a brazing powder available commercially from Handy and Harman, N.Y., N.Y. The manufacturer describes this latter product as comprising about 50 percent silver, 16 percent cadmium, 15.5 percent of each of copper and zinc, and 3 percent nickel, (all percentages by weight). The mixtures of diamond particles are mixed with the bonding matrix in a 1-to-10 volume ratio typically. The mixture of diamond particles and bonding matrix is shaped and compressed into blocks having a length of one-half inch, width of 0.090 inches and height of 0.080 inches. The shaped blocks then are heated to cure the bonding mixture, e.g. typically the mixture is heated to 1000°C and held at that temperature for one minute. Blocks 24 result having a length of about 0.5 inches, width of about 0.1 inches and height of about 0.125 inches.

The shaped, sintered blocks 24 are clamped into slots 26 spaced apart from each other by 0.5 inches and held under about 100 psi pressure.

Wire 20 is connected to a source of electricity, and the wire is heated by passing an electric current through the wire sufficient to raise the temperature of the wire rapidly to about 700°C. The wire is held at that temperature for about 10 seconds and then allowed to air cool. Upon release of pressure of blocks 24, the latter are found to be securely bonded to substrate of wire 20.

As shown in FIG. 3, the ends of the wire 20 are joined together to form continuous loop 40 which is supported between at least two sheaves 42 and 44 and tensioned to about 80 percent of the fatigue stress/strain characteristic of the wire. The sheaves are supported by appropriate support means 46 and 48 of sufficient strength to maintain the high tension on loop 40. Means, shown simply as motor and pulley arrangement 50, are provided for driving the loop at speeds preferably as high as 12,000 lineal feet per minute. The tensioned loop is positioned such that a run or linear leg of the loop is adjacent a work piece such as granite block 52. The work piece is then moved, as by an elevator or the like, substantially perpendicularly to the adjacent run of loop 40 so that the latter can gently contact the surface of the work piece and abrade a cut. Typically, the swarf is continually washed out with a liquid coolant such as water or the like. Because particularly the middle layer of the braze is highly heat conductive, the wire, cooled by the coolant, tends to serve as a heat sink to keep the abrasive blocks relatively cool. Additionally, as the wire bends in its travels around sheaves 42 and 44, the braze, particularly middle layer 36, being pliant will tend to deform under the bending stress, releiving a substantial portion of the strain which would otherwise be imposed on blocks 24. The relatively thick middle layer 36 of pliant metal remains dimensionally stable at the melting point of layers 34 and 38, so after the braze has set, the middle layer forms a cushion or barrier which serves to prevent diamond particles in blocks 24 from penetrating the braze and cutting or nicking wire 20 and therefore from creating stress concentration points at which the wire, when held under great tension, would tend to break.

As shown in FIG. 4, sheave 42 is preferably formed as a strong metal (steel or the like) disc 54 with a grooved periphery 56. The inside surface periphery 56 of sheaves 42 (and preferably of sheave 44 also) is formed of a soft, elastically pliant material 58, such as rubber or the like, that blocks 24 in loops 40 can grip or engage without substantially tearing, cutting or gouging the soft material. Thus, because blocks 24 are disposed in a helical manner along loop 40, as blocks 24 successive engage material 58, while wire 20 is being driven at an angle to each block, a torsional force will be imparted to the wire at least at sheave 42, forcing the wire to rotate slowly about its axis. This rotation serves to distribute the wear on blocks 24 substantially evenly as the blocks abrade the kerf in work piece 52.

The invention as herein described is susceptable of modification without departing from the spirit of the invention. Thus, for example, the diamond-containing blocks may be shaped but not pre-sintered. Bonding of the diamond particles into the binder matrix and bonding of the matrix onto the metallic substrate can then be affected simultaneously in one heating step. Since certain other changes may be made in the above apparatus and process without departing from the scope of the invention herein involved, it is intended that all matter contained in the above description and shown in the accompanying drawing shall be interpreted in an illustrative and not in a limiting sense.

What is claimed is:

1. A wire saw comprising, in combination;
an elongated, flexible, substantially cylindrical, metallic body having at least one helical slot along its length, and a plurality of blocks of composite, comminuted abrasive in a bonding matrix mounted in said slot in spaced apart relation along said body by a braze comprising a layer of an elastically pliant metal having high thermal conductivity bonded to both said body and blocks by a metallic material which has a melting point below the melting point of both said matrix and body.

2. A tool as defined in claim 1 wherein said body is in the form of an endless loop.

3. A tool as defined in claim 1 wherein said abrasive is diamond.

4. A tool as defined in claim 1 wherein the major proportion of said pliant metal is copper.

5. A tool as defined in claim 1 wherein the major proportion of said metallic material is silver.

6. A wire saw comprising in combination
an endless loop of flexible wire supported in tension between at least two sheaves, the surface of said wire having at least one helical groove therein extending along said wire, and a plurality of cutting elements comprising composites of comminuted abrasive in a metallic matrix disposed in said groove in spaced apart relation along said wire, and bonded to the surface of said wire, and means for driving at least one of said sheaves in rotation.

7. A wire saw as defined in claim 6 wherein the inside periphery of at least one of said sheaves is formed of a soft, elastically pliant material whereby said cutting elements may engage said material and thereby impart a torsional force on said wire so as to cause at least a portion of said wire to rotate about its axis of elongation while said wire is being driven by said at least one sheave.

* * * * *